US008249250B2

(12) United States Patent
Rane et al.

(10) Patent No.: US 8,249,250 B2
(45) Date of Patent: Aug. 21, 2012

(54) SECURE SIMILARITY VERIFICATION BETWEEN HOMOMORPHICALLY ENCRYPTED SIGNALS

(75) Inventors: Shantanu Rane, Cambridge, MA (US); Wei Sun, Boston, MA (US); Anthony Vetro, Arlington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 744 days.

(21) Appl. No.: 12/413,990

(22) Filed: Mar. 30, 2009

(65) Prior Publication Data

US 2010/0246812 A1 Sep. 30, 2010

(51) Int. Cl.
*H04L 9/00* (2006.01)
*G06F 21/00* (2006.01)
(52) U.S. Cl. ............... 380/28; 726/5; 713/182; 713/186
(58) Field of Classification Search .................. 380/28; 382/115; 713/186, 182; 726/5
See application file for complete search history.

(56) References Cited

U.S. PATENT DOCUMENTS

| | | | | |
|---|---|---|---|---|
| 6,580,814 | B1 * | 6/2003 | Ittycheriah et al. ............ | 382/115 |
| 7,237,115 | B1 * | 6/2007 | Thomas et al. ................. | 713/176 |
| 7,711,152 | B1 * | 5/2010 | Davida et al. .................. | 382/115 |
| 2002/0103999 | A1 * | 8/2002 | Camnisch et al. ............. | 713/155 |
| 2006/0245587 | A1 * | 11/2006 | Pinkas et al. ..................... | 380/28 |
| 2007/0016528 | A1 * | 1/2007 | Verhaegh et al. ............... | 705/50 |
| 2007/0044139 | A1 * | 2/2007 | Tuyls et al. ......................... | 726/2 |
| 2007/0116283 | A1 * | 5/2007 | Tuyls et al. .................... | 380/255 |
| 2007/0180261 | A1 * | 8/2007 | Akkermans et al. ........... | 713/186 |
| 2007/0286497 | A1 * | 12/2007 | Podilchuk ....................... | 382/218 |
| 2008/0222496 | A1 * | 9/2008 | Tuyls et al. .................... | 714/777 |
| 2008/0270374 | A1 * | 10/2008 | Li et al. ............................. | 707/5 |
| 2008/0298642 | A1 * | 12/2008 | Meenen ......................... | 382/115 |
| 2008/0304657 | A1 * | 12/2008 | Tuyls et al. ...................... | 380/28 |
| 2009/0006855 | A1 * | 1/2009 | Tuyls et al. .................... | 713/182 |
| 2009/0208019 | A1 * | 8/2009 | Celik et al. .................... | 380/277 |
| 2010/0017618 | A1 * | 1/2010 | Golic et al. .................... | 713/186 |

OTHER PUBLICATIONS

P. Paillier, "Public-Key Cryptosystems Based on Composite Degree Residuosity Classes," in Advances in Cryptology, Eurocrypt 99. 1999, vol. 1592, pp. 233-238, Springer-Verlag, Lecture Notes in Computer Science.*

Bringer, J.; Chabanne, H.; Cohen, G.; Kindarji, B.; Zemor, G.; , "Optimal Iris Fuzzy Sketches," Biometrics: Theory, Applications, and Systems, 2007. BTAS 2007. First IEEE International Conference on , vol., No., pp. 1-6, Sep. 27-29, 2007.*

(Continued)

*Primary Examiner* — Jung Kim
*Assistant Examiner* — Theodore Parsons
(74) *Attorney, Agent, or Firm* — Dirk Brinkman; Gene Vinokur (57) ABSTRACT

A method for verifying a similarity between a first signal and a second signal is described. The first and the second signals are encrypted homomorphically using a key. First, we acquire a set of error patterns determined by a similarity constraint. Then, each error pattern is homomorphically encrypted using the key and presented to a verifier in the setup phase. The verifier declares the first signal similar to the second signal, if any error pattern in the set of error patterns satisfies a homomorphic relationship between the first encrypted signal and the second encrypted signal.

6 Claims, 8 Drawing Sheets

OTHER PUBLICATIONS

A. Inan, S. Kaya, Y. Saygin, E. Savas, A. Hintoglu, and A. Levi, "Privacy preserving clustering on horizontally partitioned data," Data and Knowledge Engineering, vol. 63, No. 3, pp. 646-666, Dec. 2007.*

Sutcu, Y.; Rane, S.; Yedidia, J.S.; Draper, S.C.; Vetro, A.; , "Feature transformation of biometric templates for secure biometric systems based on error correcting codes," Computer Vision and Pattern Recognition Workshops, 2008. CVPRW '08. IEEE Computer Society Conference on , vol., No., pp. 1-6, Jun. 23-28, 2008.*

Rane, S.D.; Wei Sun; Vetro, A.; , "Secure distortion computation among untrusting parties using homomorphic encryption," Image Processing (ICIP), 2009 16th IEEE International Conference on , vol., No., pp. 1485-1488, Nov. 7-10, 2009.*

Rane, S.; Wei Sun; , "Privacy preserving string comparisons based on Levenshtein distance," Information Forensics and Security (WIFS), 2010 IEEE International Workshop on , vol., No., pp. 1-6, Dec. 12-15, 2010.*

\* cited by examiner

SECURE SIMILARITY VERIFICATION BETWEEN HOMOMORPHICALLY ENCRYPTED SIGNALS

FIELD OF THE INVENTION

This invention relates generally to verifying similarities between signals, and more particularly to securely verifying similarities between encrypted signals.

BACKGROUND OF THE INVENTION

It is often required to verify securely the similarity between two signals. The conventional methods use cryptographic hash functions to verify whether two signals are similar. If the hashes of signals x and y are equal, then the signal x is equal to the signal y, assuming that hash collisions occur with negligibly low probability. This comparison of cryptographic hashes is a fundamental building block of most password and key management applications. An essential property of conventional cryptographic hash functions is that the hashes do not preserve the underlying statistical structure of the signals being compared. Specifically, if one signal is a noisy version of the other signal, the cryptographic hashes of the two signals are very different even if the noise is small. Therefore, a cryptographic hash cannot, by itself, be used in noisy environments, e.g., storage or communication channels, to verify inexact matches, because matching based on cryptographic hashes is sensitive to noise.

One method for solving the problem of inexact matches of the signals assumes that one of the signals, e.g., the signal x is transmitted via a noisy channel and received as a corrupted signal y. Then, some error correcting code (ECC) is also transmitted, along with the signal x, to recover an estimated signal $\tilde{x}$. Now, the cryptographic hashes of the signal x and the estimated signal $\tilde{x}$ can be compared. If the error correction is successful, then the hashes match exactly, and therefore the signals x and y are, in fact, similar up to some allowable distortion determined by characteristics of the ECC. That method exploits common randomness, and has been widely adopted in fuzzy vault-based schemes for biometric authentication, secure collaboration and image authentication.

However, the above randomness method cannot be utilized if the signals x and y have already been encrypted, which is important in many applications. For instance, a hospital wants medical data to be analyzed and classified by a third party, without revealing the underlying data to the third party. Moreover, the third party might want not to expose the classification method to the hospital. It is often desired to perform the computation in this "double blind" fashion.

This problem is often defined as secure multiparty computation (SMC). Computationally secure methods, such as Oblivious Transfer (OT), Secure Inner Product (SIP) are used as primitives to perform more complicated operations thereby enabling secure multiparty computation. Examples of such methods include blind vision, see U.S. patent application Ser. No. 11,005,293. Those methods perform face detection without revealing the test image supplied by a user or the classification method used by classifier. However, that method requires a large number of key exchanges between the user and the classifier. The overhead, in terms of handshaking and key management, is very large.

Hence, it is often desired to securely verify the similarity between the two signals while minimizing the overhead.

SUMMARY OF THE INVENTION

The invention provides a method for securely verifying similarity between two encrypted signals up to some predetermined distortion threshold. The method uses secure multiparty computing (SMC). In SMC, a first party, Alice, operates a client computer, and a second party, Bob, operates a server computer. A third party, Charlie, is an untrusted verifying agency with bounded computational capability.

The invention is based on the realization than any two homomorphically encrypted signals are dissimilar by an error pattern and an encrypted version of that error pattern can be selected from a finite set of error patterns, wherein the set of error patterns is determined by a dissimilarity constraint.

Furthermore, multiple codebooks maybe designed for a signal alphabet, such that the indices from each codebook maybe combined to uniquely identify any element of the alphabet. Secrecy is preserved because the identified element is in encrypted form.

Alice has a test signal x, and Bob has a reference signal y. Alice wants to determine whether the signal x is similar to the reference signal y according to a predetermined threshold, i.e., $d(x, y) \leq D$, where $d(x, y)$ is a predetermined distortion measure, and D is a predetermined threshold. However, none of the parties want to reveal any data to each other, or the processes used to operate on the data.

The embodiments use the untrusted verifier, Charlie, to satisfy the above constraints. The method combines homomorphic encryption of the signals x and y with a binning code for the signal x.

Alice and Bob use the homomorphic function to encrypt the data before transmitting the data to Charlie. Alice and Bob use the same public key for encryption. According to the invention, during a setup phase, Charlie acquires a set of encrypted error patterns, wherein each error pattern is homomorphically encrypted using the same public key. The set of encrypted error patterns is determined by a similarity constraint. In one embodiment, the two encrypted signals are similar according to the similarity constraint, if an error pattern from the set of error patterns satisfies a homomorphic relationship between the encrypted signal of Alice and the encrypted signal of Bob.

Some embodiments of the invention address the case in which one of the parties, e.g., Alice, operates under a bandwidth constraint and needs to reduce the communication overhead. The embodiments solve this problem using a pair of binning codes. Charlie has a codebook containing all possible encrypted values of the signal x, but no other information. Acquiring one or maximum two bin indexes allows Charlie to determine whether the signals x and y are similar up to a specified distance.

Embodiments of the invention have wide-ranging applications in, for example, secure medical data processing, secure keyword search and secure data classification.

DETAILED DESCRIPTION OF THE PREFERRED EMBODIMENT

Figure 1:
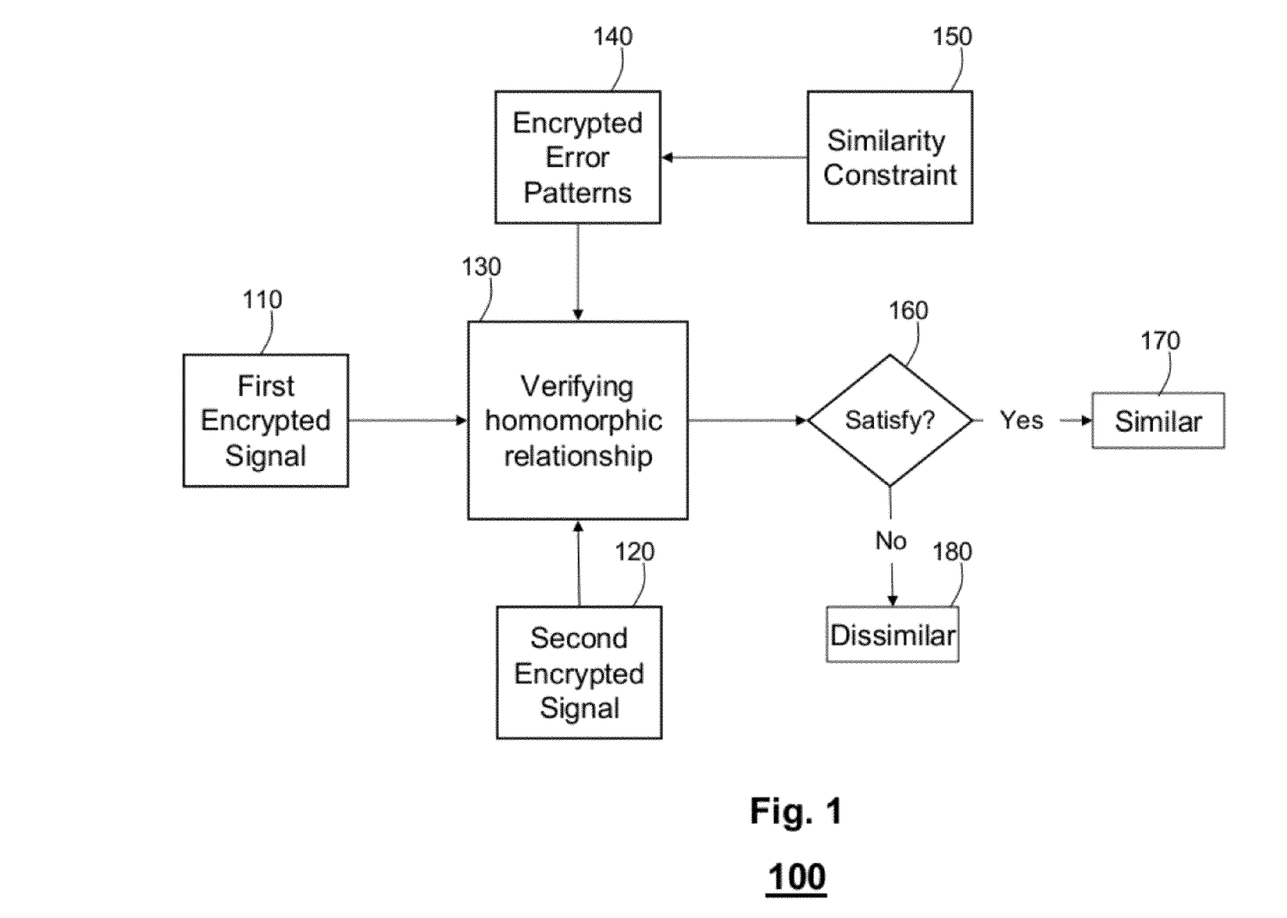
FIG. 1 is a block diagram of a method and system for verifying similarity of two signals using an untrusted verifier according to embodiments of the invention.
Figure 2:
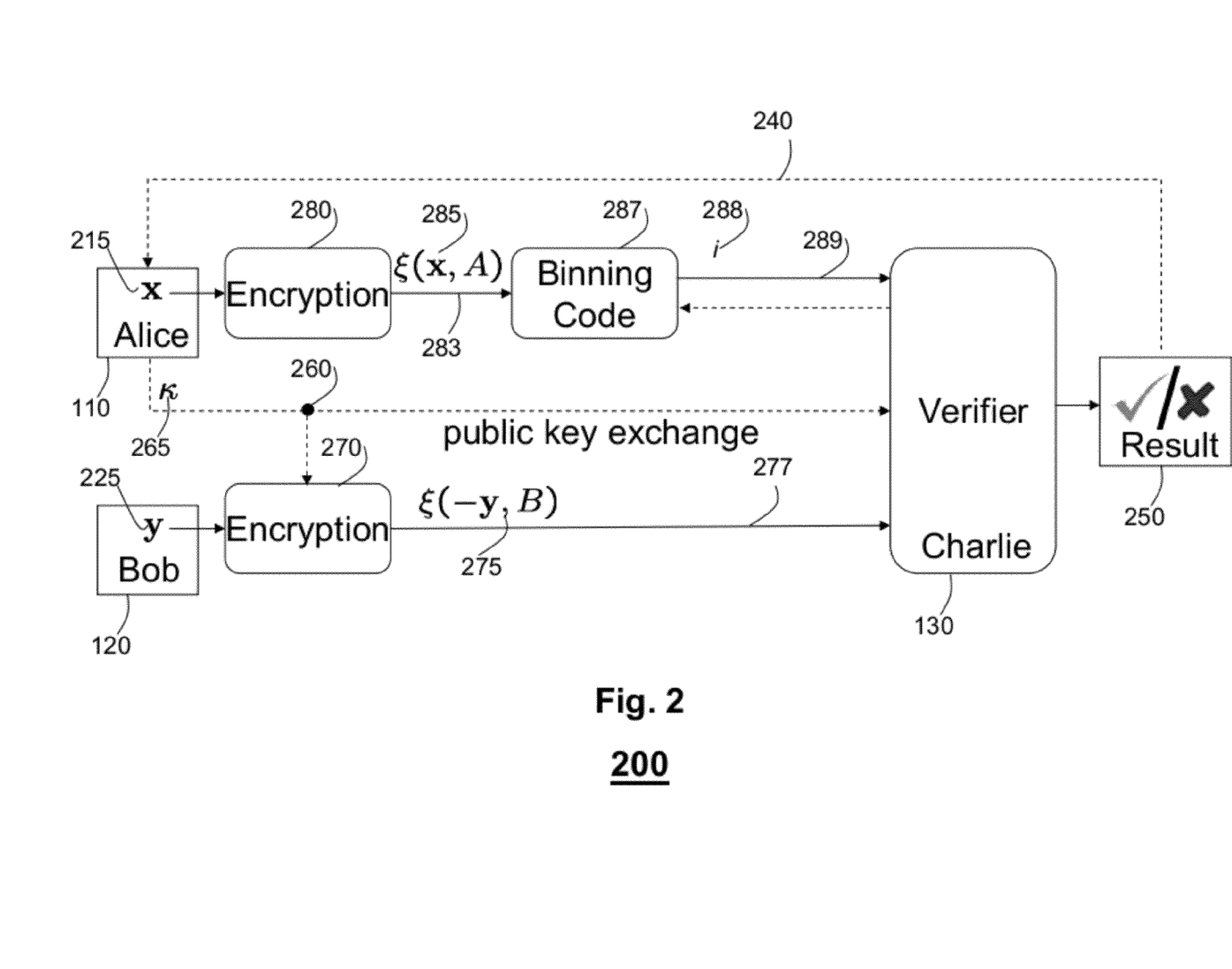
FIGS. 2-3 are flow charts of the method of FIG. 1 according to the embodiments of the invention.

FIGS. 1 and 2 show a method and a system 100 for verifying 130 similarities of two encrypted signals 110 and 120 according to an embodiment of the invention. In one embodiment, the system includes at least processors to perform the steps of the method: a client processor (Alice), a server processor (bob), and a processor at a verifier (Charlie).

The signals 110 and 120 are encrypted homomorphically using a public key. Another input to the verifier 130 is a set 140 of encrypted error patterns, in which each error pattern is homomorphically encrypted by the same public key used for encryption of the signals.

The set 140 are determined by a similarity constraint 150, described in details below. If any error pattern from the set 140 satisfies 160 a homomorphic relationship between the first encrypted signal 110 and the second encrypted signal 120, we declare that the signals are similar 170. Otherwise, the signals are dissimilar 180.

Homomorphic Encryption

Homomorphic encryption is a form of encryption where a specific algebraic operation is performed on the plaintext by performing a possibly different algebraic operation on the ciphertext. Let $\mathcal{P}$ be a set of plaintexts associated with a binary operator $\cdot_\mathcal{P}$ and $\mathcal{H}$ be a set of ciphertexts associated with a binary operator $\cdot_\mathcal{H}$.

Definition 1.1: An encryption function $\xi: \mathcal{P} \rightarrow \mathcal{H}$ is homomorphic if for all $a, b \in \mathcal{P}$, $$\xi(a \cdot_\mathcal{P} b) = \xi(a) \cdot_\mathcal{H} \xi(b)$$

Many public-key cryptosystems use the homomorphic property. The embodiments of the invention are concerned with cryptosystems in which the binary operator $\cdot_\mathcal{P}$ a is the integer addition operator while the $\cdot_\mathcal{H}$ operator is the integer multiplication operator. Both the addition and multiplication operations are over a finite set of integers. The Paillier cryptosystem, a probabilistic asymmetric encryption process for public key cryptography, is one such cryptosystem we use.

The signals are x and y, and a distance measure is $d(x, y) = |x-y|$. If $\xi(\cdot)$ denotes an encryption function, then $\xi(x)$ is the encrypted version of the signal x.

In one embodiment, the distance measure is a mean absolute error (MAE). For simplicity, the embodiments of the invention are described using this distance measure. However, the invention also works for other distance measures such as squared distance, i.e., Euclidean distance where $d(x, y) = (x-y)^2$.

In one embodiment, the signals x and y are singleton integers. In another embodiment, the signals x and y are vectors of integers of the same length. In that embodiment, the distance measure is calculated for each element of the vectors, and the final distance between x and y is the sum of the distances between the pairs of individual elements. For example, for an n-length vector, the MAE distance measure is $d(x, y) = \Sigma |x_i - y_i|$, where the summation is from $i=1$ to $n$.

Similarity Constraint

We use a similarity constraint that signals x and y must satisfy to be classified as similar.

Definition 2.1: Signal y is similar to x, with respect to the distance function $d(\cdot, \cdot)$, if and only if $d(x, y) = |x-y| \leq D$, wherein D is a predetermined distortion threshold. The signal y can be written as $y = x - e$ for some positive or negative integer e. We refer to the integer e as the error pattern. Thus, the signal y is similar to the signal x if and only if $|e| = |x - y| \leq D$. Other distance measures, such as squared distance, are also used by the embodiments.

The similarity constraint determines the error patterns that are stored at the verifier. Using the above definition of the similarity constraint, examples of the error patterns that satisfy the similarity constraint are —D, −D+1, −D+2, . . . , 0, . . . , D−2, D−1, D.

Paillier Homomorphic Cryptosystem

Configuration: We choose two prime numbers p, q, and let $N = pq$. We select $g \in Z^*_{N^2}$, such that $\gcd(L(g^\lambda \mod N^2), N) = 1$, where $\lambda = \mathrm{lcm}(p-1, q-1)$, and $L(x) = (x-1)/N$. Here, gcd refers to greatest common divisor and lcm refers to least common multiple. We use (N, g) as the public key, and (p, q) as the private key, and as described above, $Z^*_{N^2}$ the set of nonnegative integers that have multiplicative inverses modulo $N^2$.

Encryption: Let $m \in Z_N$ be a plaintext. Then, the ciphertext is $$c = \xi(m, r) = g^m \cdot r^N \mod N^2 \qquad (1)$$

where $r \in Z^*_N$ is a randomly selected integer, $Z_N = \{0, 1, 2, \ldots, N-1\}$ and $Z^*_N$ is the set of nonnegative integers that have multiplicative inverses modulo N. The integer r is a parameter of the Paillier encryption function. The result of the encryption depends on this random parameter. If the message m is encrypted multiple times with different r, then the corresponding ciphertexts are different. Thus, the Paillier encryption is probabilistic in nature, as the encrypted value depends on the constant r, which is chosen at random.

Decryption: Let $c \in Z^*_{N^2}$ be a ciphertext. Then, the corresponding plaintext is $$m = \frac{L(c^\lambda \mod N^2)}{L(g^\lambda \mod N^2)} \mod N.$$

where the function $L(.)$ is defined as $L(x) = (x-1)/N$. Mathematically, the decryption gives the result m, irrespective of the value of r used during encryption.

The homomorphic property holds for the Paillier encryption function from the plaintext set $(Z_N, +)$ to the ciphertext set $(Z^*_{N^2})$ i.e., $$\xi(m_1 + m_2, r_1 r_2) = \xi(m_1, r_1) \cdot \xi(m_2, r_2).$$

In the above relation, $r_1$ and $r_2$ are parameters used in the Paillier encryption. Just like r in equation (1) above, these parameters are chosen at random from the set $Z^*_N$.

Paillier Homomorphic Relationship

We use the homomorphic relationship of Paillier encryption. According to the Paillier homomorphic relationship, the encrypted value of the sum of two signals equals the product of the encrypted values of each of the two signals. We apply this relationship to the signals x, y, and to the error pattern e. Thus, $e = x - y$ implies $\xi(x, A)\xi(-y, B) = \xi(e, AB)$. In this relationship, A and B are the parameters used by Alice and Bob respectively, when they perform encryption of the signals x and y respectively. A and B are randomly selected integers from $Z^*_N$. Parameters A and B perform the same role as the random number r in equation (1). AB is also an encryption parameter, which is equal to the product of the encryption parameters A and B, modulo N.

Thus, for a set of allowable error patterns 140, the signal x 110 and the signal y 120 are similar if and only if it is possible to determine some error pattern e in the set of error patterns 140 that satisfies 160 the homomorphic relationship $\xi(x, A)\xi(-y, B) = \xi(e, AB)$, where A is known to Alice, B is known to Bob.

A and B are parameters of the Paillier encryption used by Alice and Bob respectively, but they need not be secret. Alternatively, Alice can select A and B at random from the set $Z^*_N$ and send B to Bob. Charlie does not know either A or B.

FIG. 2 shows a method and a system 200 for verifying similarity of two signals using an untrusted third-party verifier according to embodiments of our invention.

A first party, e.g., Alice 110, typically operating a client computer, including a first processor, has a signal x 215.

A second party, e.g., Bob 120, typically operating a server computer, has a signal y 225. Alice and Bob know nothing about each other's signals x 215 and y 225, other than the fact that x and y are both integers. Alice verifies whether the signal x 215 is compatible with the signal y 225 using an untrusted third party verifier, e.g., Charlie 130 operating a third processor.

The only information that Charlie receives during the method 200 is whether the signals x and y are similar, i.e., Charlie does not find out anything about the signals themselves. In one embodiment, Charlie communicates 240 a result 250 to Alice.

Alice 110 shares 260 a public key κ 265 with Bob and Charlie. Using the key κ 265 and the randomly chosen constant B, Bob encrypts 270 the signal y 225 to produce an encrypted signal ξ(y, B) 275 and transmits 277 the encrypted signal 275 to the verifier Charlie. For simplicity, it is assumed that the transmission 277 is error-free, but the transmission 277 can be protected using an error correcting code (ECC). Similarly, Alice uses the public keV K 265 and the randomly chosen constant A to encrypt 280 the signal x 215 to produce an encrypted signal ξ(x, A) 285.

Some embodiments of the invention are used when Alice needs to reduce the average bandwidth required to transmit the encrypted signal ξ(x,A) 285 to Charlie in a timely manner, or when Alice needs to send only a certain limited amount of information per transmission to Charlie. In these embodiments, we compress 283 the encrypted signal ξ(x, A) 285 using, e.g., a binning code C 287, and transmit 289 only the index i 288, corresponding to bin $C_i$, to Charlie. Once again, the transmission 289 is assumed to be error-free, but if a reliable channel is not available, the bin index i 288 can also be protected by an error correcting code (ECC). The binning code 287 is applied to encrypted versions of the signal x.

Figure 5:
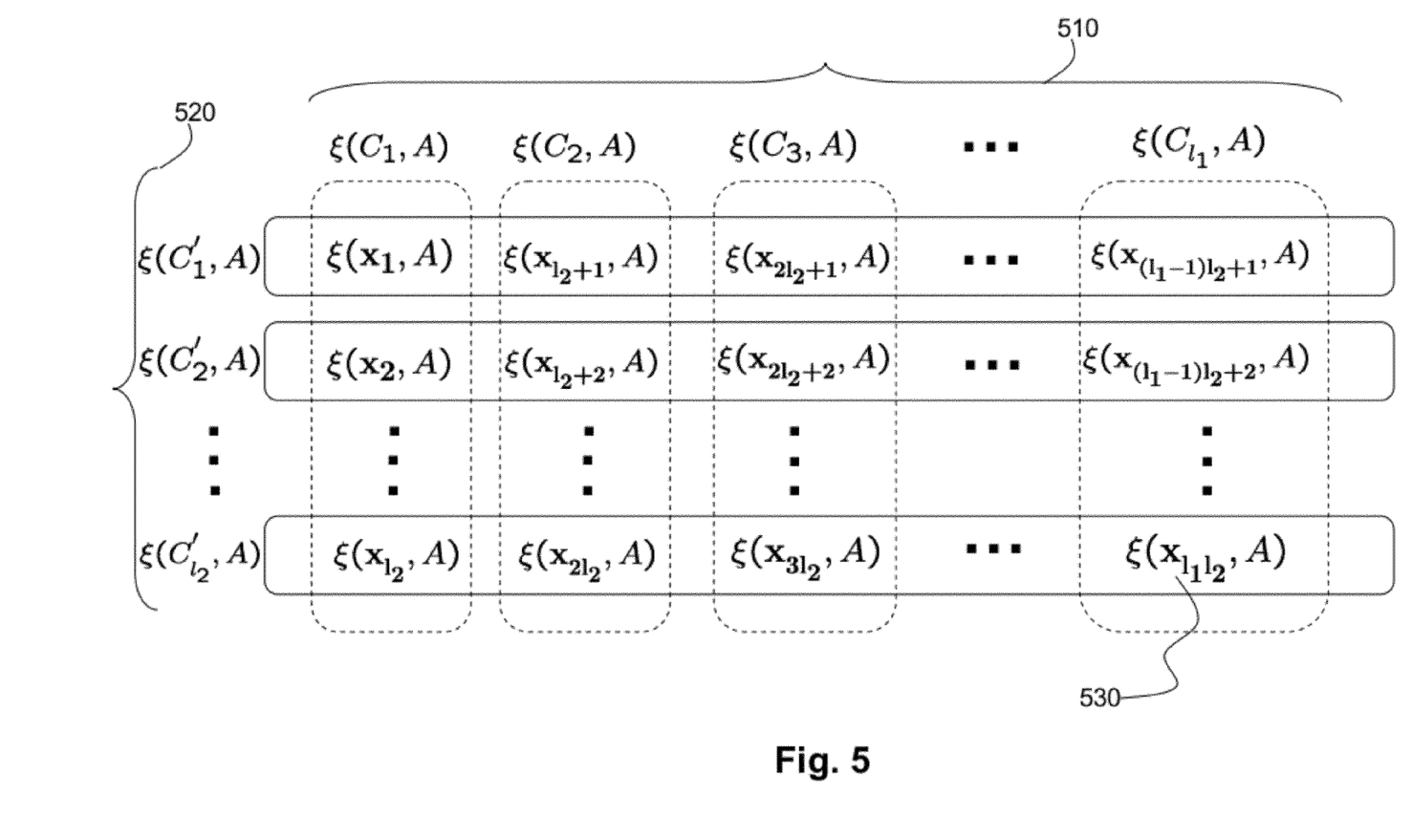

Further, a codebook, as shown in FIG. 5, is made available to Charlie, e.g., during a setup phase. This is usually the case in digital communication, where the encoder and decoder use a codebook that is agreed upon during the setup phase, prior to actual data transmission. Based on the bin index i 288, Charlie can locate a bin in the codebook. The bin contains a predetermined number of encrypted signal variations, including the encrypted signal x. But Charlie does not know which encrypted variation corresponds to the encrypted signal x. Because the private key used to reverse the encryption function ξ(·,·) is available only to Alice, Charlie does not have access to the signals x and y.

Charlie determines whether the signals x 215 and y 225 are similar according to Definition 2.1, provided below, given the bin index i 288. Furthermore, in some embodiments, there is a feedback channel 240 between Charlie and Alice, which is used to provide single-bit feedback to Alice. Usually, the feedback channel is used at most one time during the method of verifying the similarity of the signals x and y and one additional time when the result 250 is communicated back to Alice.

Checking for the Similarity of Signal x and Signal y

Figure 3:
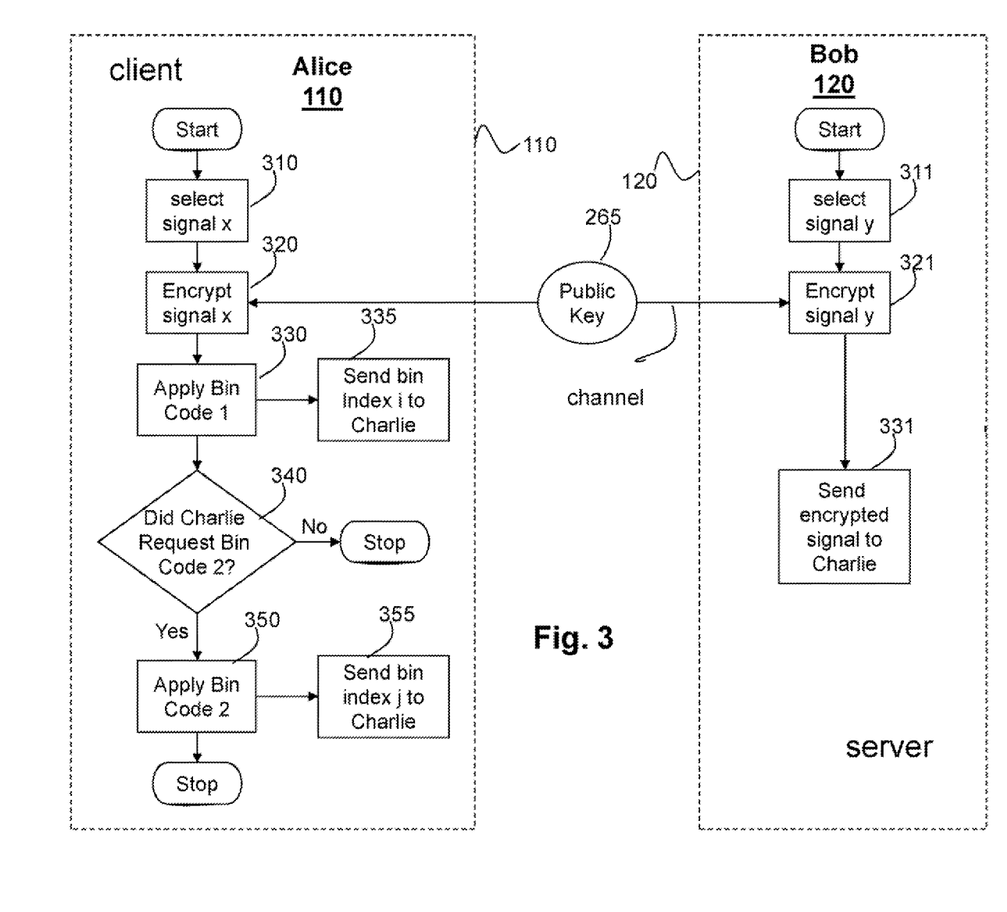
Figure 4:
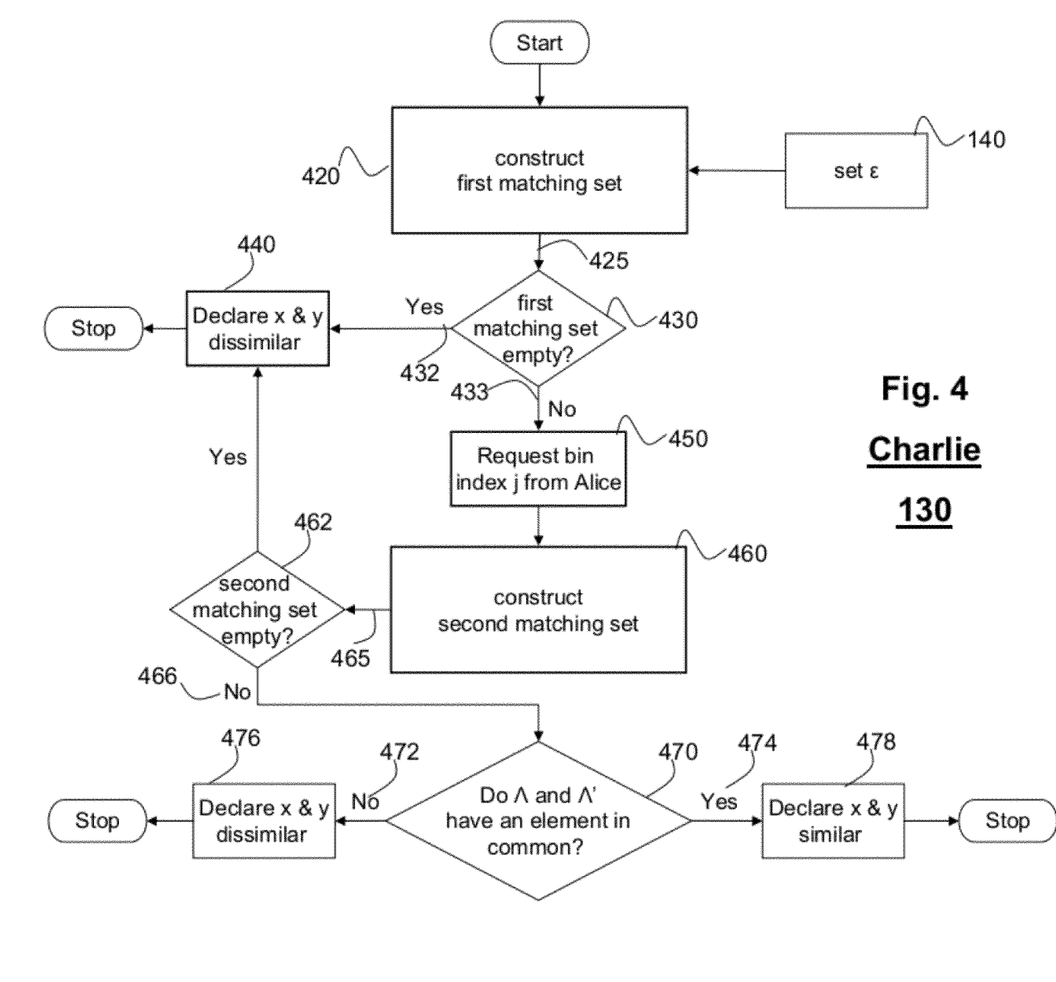
FIGS. 4-5 are schematics of two codebooks that satisfy the conditions according to the embodiments of the invention.

FIGS. 3-4 show a method for verifying securely the similarity of two integer signals x and y according to the Definition 2.1.

Alice 110 selects 310 an integer signal x from some set of integers $\mathcal{A}$ and encrypts 320 the signal x with the homomorphic encryption function to determine ξ(x, A), wherein A is the parameter for the Paillier encryption.

According to the Paillier encryption, the number which is being encrypted belongs to the set of non-negative integers {1,2, . . . , N}. Therefore, if the integer x is negative, then modulo N arithmetic is used to obtain the non-negative integer corresponding to the original negative integer. The integers x, y and e belong to an additive group of size N where N is substantially larger in magnitude than x, y or e. The public key for the homomorphic encryption, κ=(N, g) 265 is available to both Alice and Bob. The private key (p, q) is known only by Alice.

We let codebooks $C=\{C_1, C_2, \ldots, C_{l_1}\}$, $l_1 = 2^{nR_1}$ and $C' = \{C'_1, C'_2, \ldots, C'_{l_2}\}$, $l_2 = 2^{nR_2}$, be two partitions of the set $\mathcal{A}$ such that $C_i \cap C'_j$ contains at most one common element in $\mathcal{A}$4 for any i=1, 2, . . . , $l_1$ and j=1, 2, . . . , $l_2$. Each $C_i$ is a bin with index i. Thus, the partitions C and C' are two codebooks that can be used for compressing x, such that any bin chosen from C has at most one element in common with any bin chosen from C'. Alice uses the binning codes to compress ξ(x, A), as described below, where ξ(·,·) is an encryption function.

As defined herein, $\xi(C_i, A) = \{\xi(x, A) | x \in C_i\}$ and $\xi(C'_j, A) = \{\xi(x, A) | x \in C'_j\}$ for i=1, 2, . . . , $l_1$ and j=1, 2, . . . , $l_2$. Thus, the partitions in the codebooks ξ(C, A) and ξ(C', A) are the same as the partitions in C and C'. The only difference is that ξ(C, A) and ξ(C', A) now contain encrypted versions of elements of the set $\mathcal{A}$ while C and C' contain the actual integer elements from $\mathcal{A}$.

Then, Alice compresses 330 the encrypted signal ξ(x, A) using the codebook $\xi(C, A) = \{\xi(C_1, A), \xi(C_2, A), \ldots, \xi(C_{l_1}, A)\}$. That is, ξ(x, A) is compressed into the bin index i if and only if ξ(x, A)∈ξ(A). Then, the index i is transmitted 335 to Charlie.

FIG. 5 shows an example of two codebooks C 510 and C' 520 that satisfy the required conditions, i.e., any $C_i$ 510 and $C'_j$ 520 have at most one element in common, e.g., an element 530. The method first partitions the set $\mathcal{A}$, and uses the same partitions for the encrypted versions of the elements of the set $\mathcal{A}$. Optionally, we construct the partitions in the plaintext domain and then use the partitions for the encrypted elements of $\mathcal{A}$. Alternatively, Alice generates the partitions directly from the encrypted elements of $\mathcal{A}$.

Figure 6:
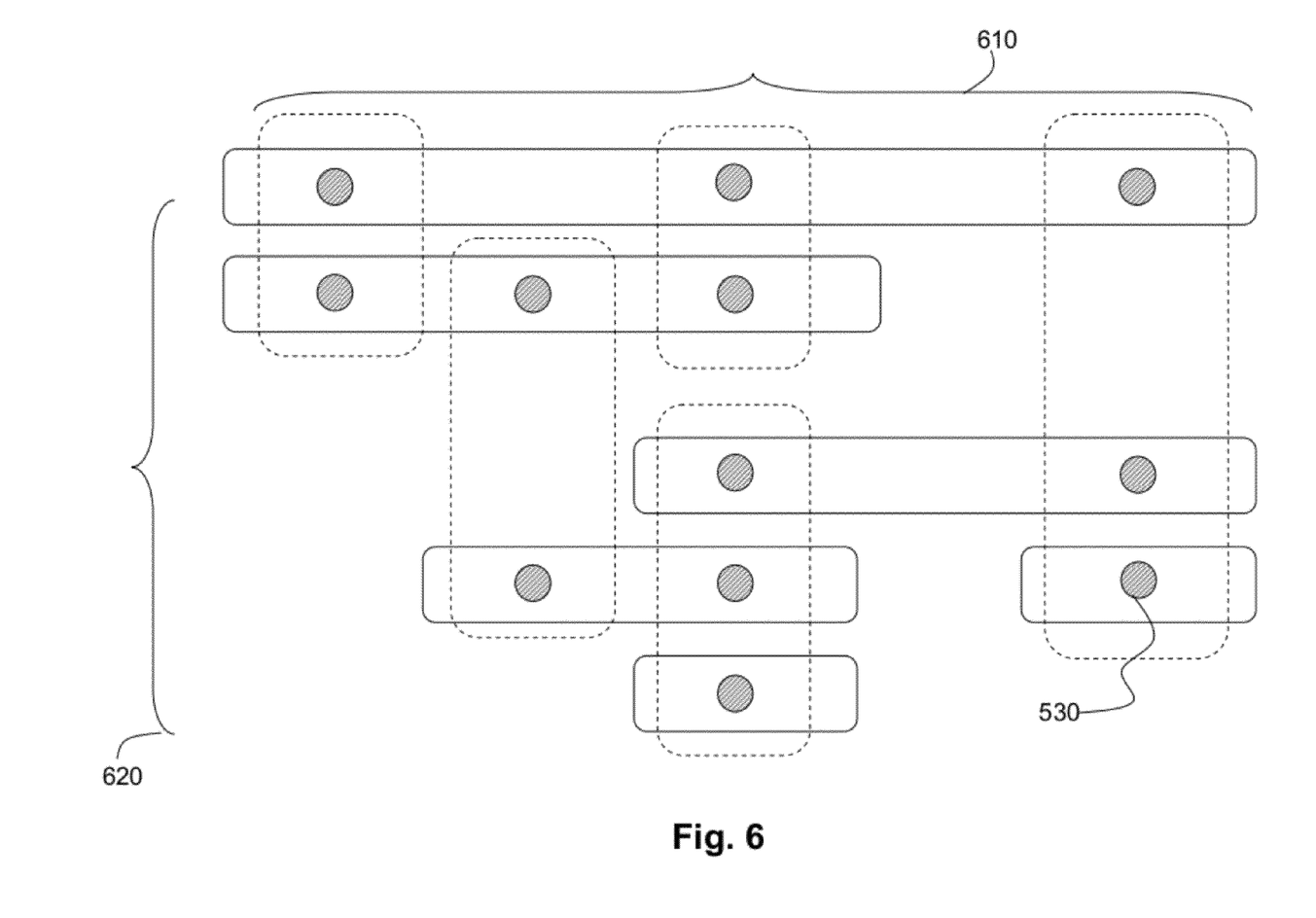
FIGS. 6-8 are schematics of similar and dissimilar signals according to the embodiments of our invention.

FIG. 6 shows another example of two codebooks C 610 and C' 620 that satisfy the required conditions. Alice arbitrarily constructs two codebooks ξ(C, A) and ξ(C', A), from the set $\xi(\mathcal{A}, A) = \{\xi(x, A) | x \in \mathcal{A}\}$, such that any intersection between a bin from ξ(C, A) and a bin from ξ(C', A) contains at most one common element 530. The codebooks ξ(C, A) and ξ(C', A), containing the elements from $\xi(\mathcal{A}, A)$ are acquired by Charlie during the setup phase. Charlie cannot retrieve the information from the encrypted codebooks because he does not possess the private key.

Bob 120 selects 311 an integer signal yΩ. Using the public key κ 265 and the encryption parameter B, Bob computes 321 an encrypted signal ξ(-y, B) and transmits the encrypted signal ξ(-y, B) 331 to Charlie. Similar to Alice, if -y is negative, then Bob uses modulo N arithmetic to find a non-negative integer corresponding to -y in an additive group of size N, and encrypts that number.

Referring to FIG. 4, Charlie receives, as input, data transmitted by Alice and Bob. Charlie also receives an error pattern set $140\epsilon = \{\xi(e, AB): |e| \leq D\}$. The error pattern set c is a set of all encrypted error patterns that are possible under similarity constraint. This set can be sent to Charlie either by Alice or by Bob in the "setup" stage, before the protocol is executed.

Because the threshold D is typically small, |ϵ|, the number of elements in ϵ, is manageable. The number of elements in t grows linearly with D, and, in the example above, equals to 2D+1.

Then, Charlie constructs 420 a first matching set Λ425 of signals indexed by Alice's bin index i 335 that match with the encrypted signal $\xi(-y, B)$ 321 of Bob according to the similarity constraint. The first matching set includes all signals from the bin with index i which in combination with any appropriate error pattern from the set of error pattern 140 satisfy the homomorphic relationship for the encrypted signal $\xi(-y, B)$, i.e., $\Lambda = \{\xi(\bar{x}, A) \epsilon \xi(C_i, A) | \xi(e, AB) = \xi(\bar{x}, A) \xi(-y, B)$ for some $\xi(e, AB) \in \epsilon\}$.

Charlie determines 430 if the first matching set $\Lambda$ 425 is empty, i.e., $\Lambda = \emptyset$. If the first matching set 425 is empty 432, then Charlie determines 440 that the signal y is dissimilar to the signal x, i.e., the signal x violates the similarity constraint. Otherwise 433, Charlie requests 450 Alice for another compressed version of $\xi(x, A)$ from the codebook $\xi(C', A) = \{\xi(C'_1, A), \xi(C'_2, A), \ldots, \xi(C'_{j2}, A)\}$. The request is made preferably by a single-bit error-free feedback.

Referring to FIG. 3, when Alice receives 340 a request for another compressed version of $\xi(x, A)$ from Charlie, Alice transmits 355 an index j of the bin $C'_j$ 350 containing the signal x. Equivalently, Alice transmits 255 the index j of the bin $\xi(C'_j, A)$ containing $\xi(x, A)$.

Referring to FIG. 4, Charlie, upon receiving the index j of the bin $C'_j$, constructs 460 a second matching set 465 $\Lambda'$ of entries indexed by Alice's bin index j that match with the encrypted signal $\xi(-y, B)$ 321 of Bob according to the similarity constraint, i.e., $\Lambda' = \{\xi(\bar{x}, A) \epsilon \xi(C'_j, A) | \xi(e, AB) = \xi(\bar{x}, A) \xi(-y, B)$ for some $\xi(e, AB) \in \epsilon\}$. If the second matching set is empty 462, i.e., $\Lambda' = \emptyset$, then Charlie again decides 440 that the signal y is dissimilar to the signal x, i.e., violates the similarity constraint.

If the first 425 and the second 465 matching sets are not empty 466, i.e., $\Lambda \neq \emptyset$ and $\Lambda' \neq \emptyset$, Charlie compares the matching sets 470 to determine if the matching sets 425 and 465 have common elements. If, the matching sets do not have common elements 472, i.e., $\Lambda \cap \Lambda' = \emptyset$, then Charlie declares 476 that the signal y is dissimilar from the signal x, i.e., violates the similarity constraint.

Figure 7:
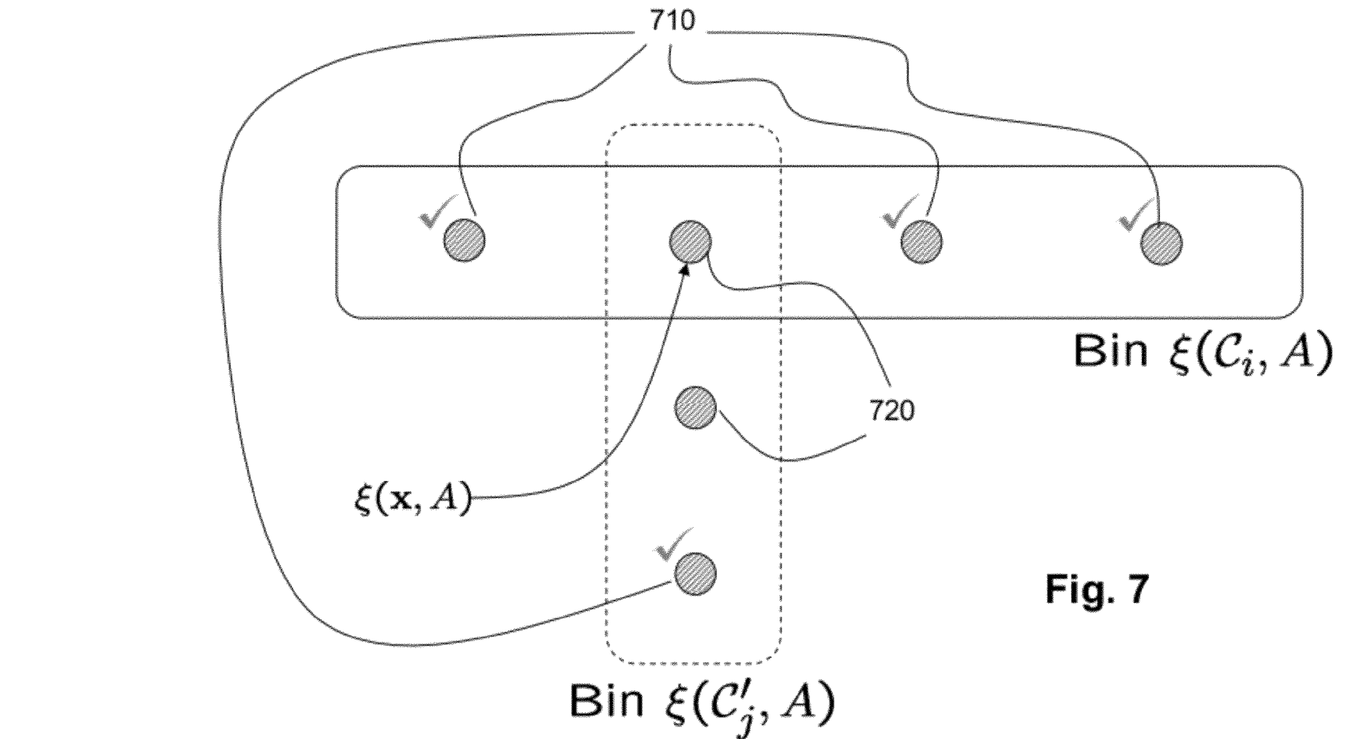

FIG. 7 shows an example when the signal y and the signal x are dissimilar. Elements $\bar{x}$ 710 of the first and the second matching sets, i.e., $\bar{x} \in \Lambda \cup \Lambda'$, satisfy the equality $\xi(e, AB) = \xi(\bar{x}, A) \xi(-y, B)$ for some $\xi(e, AB) \in \epsilon$, and elements 720 do not. The intersection set is empty, i.e., $\Lambda \cap \Lambda' = \emptyset$ and thus the signals x and y are dissimilar.

Figure 8:
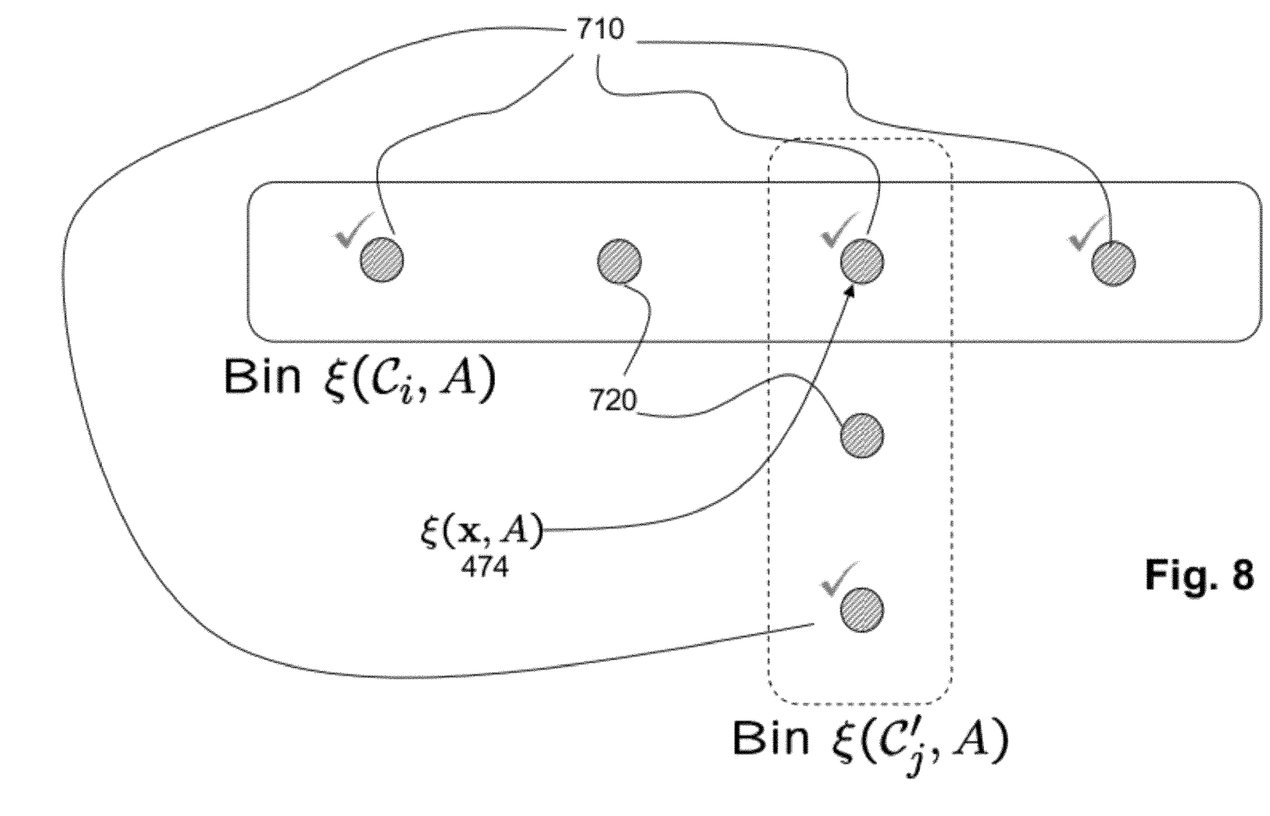

If, the matching sets 425 and 465 have common elements 474, then Charlie declares 478 that the signal y is similar to the signal x, within the distance D. By construction, $\Lambda \cap \Lambda'$ is either empty or has only one element $\xi(x, A)$ 474 chosen by Alice as shown in FIG. 8. Thus, if the test for similarity succeeds, Charlie determines $\xi(x, A)$, and therefore determines $\xi(e, AB)$ that satisfies $\xi(e, AB) = \xi(x, A) \xi(-y, B)$, where $\xi(x, A) \in \Lambda \cap \Lambda'$. Charlie cannot know the values of x, y or e.

As shown in FIG. 2, Charlie may transmit 240 the result 250, i.e., similar or dissimilar, to Alice. If required, Charlie may encrypt the result using the public key $\kappa$ 265, and Alice can decrypt the result with the private key.

EXAMPLE

Let D=3, meaning that x and y are compatible if and only if $|x-y| \leq 3$. Now let
$\mathcal{A} = \{0, 7, 15, 25, 33, 41, 49, 57, 65, 73, 81, 90, 98, 110, 118, 126\}$
Alice chooses two partitions of $\mathcal{A}$, namely C and C', each having four bins as follows:
$C_1 = \{0, 81, 110, 49\}$
$C_2 = \{33, 57, 15, 90\}$
$C_3 = \{7, 126, 41, 73\}$
$C_4 = \{118, 998, 65, 25\}$
$C'_1 = \{0, 33, 7, 118\}$
$C'_2 = \{81, 57, 126, 98\}$
$C'_3 = \{110, 15, 41, 65\}$
$C'_4 = \{49, 90, 73, 25\}$ For the Paillier cryptosystem, choose p=1125899906846567, q=1125899906848559 and g=2. Thus N=pq=1267650600239351040776518046953. In this example, the chosen magnitude of p, q and N is small only for illustrative purposes. In other examples, N is very large and difficult to factorize. For convenience, Alice chooses A=11234565325115 and B=23456787867851 at random from the set $\{1, 2, \ldots, N\}$ as the parameters for Paillier encryption. She provides the value of B to Bob. Keeping the same partitions C and C' as above, Alice encrypts the codebook entries using the parameter A, giving her the codebooks $\xi(C, A)$ and $\xi(C', A)$ with the following bins:

$\xi(C_1, A) \equiv \{1134701706642535887619380199331276277774-03329370411584822576, 799247664224471132601808927-40618031420345572850177345590509990, 15117-152130573550195564542071815314830491330334170045-962641218, 21909436932345934661575706795-9428185295776431583377803277932,\}$ $\xi(C_2, A) \equiv \{931074073975256156926437852307184431131469505976969-0718443113146950597696986715165515, 14522650-41041235381019511460212027388863519142898866621-1287486, 10895281915723637683521655555486033382-36479991125970180977102, 1052540834106705-75761371784611369801871589390021991003771794,\}$ $\xi(C_3, A) \equiv \{11724380073727238056882249445793-6707070711992898134470551199, 8238965331-66811552468320769944147675049855770358553813209580, 5281323831619029911999697572440066400999-21756865164621283607048, 152218068117860-9221555293558842978586186597518906537111736053\}$ $\xi(C_4, A) = \{113339639137580095762337033626961-440357174870786754034154164281, 0918001353-5644812891801108904595150230335886251881705419-2361, 5771622762160649394095566513446692076-01326024613747006826441137, 461865434792734-006902153335984462338933697497610496797991402\}$ The encrypted version of the second codebook is:
$\xi(C'_1, A) \equiv \{13470170664253588761938019933127627774-0332937041158482257676, 931074-07397525615692643785230718443113146950597696988-67151655, 11724380073727238056882249445793367-670707071199289813447055119, 13339639137580-0957623370336269614403571748707867540341594148,\}$ $\xi(C'_2, A) \equiv \{79924766422471132601807-8927406180314203455728501773455905097, 1452-265041041235381019511460212027388863519142898886-6211287486, 8238965331166811552468320-69944147675049855770358553813209580, 1091800-13535644812891801108904595150230335886251881705-4192361,\}$ $\xi(C'_3, A) \equiv \{1511715213057355019556454207-1815314830491330341704599062641218, 108952819-157236376835216555554860333823647999111259709180-97102, 5281323831619029911999697572440664009-9921756865164621283607048, 577162276216064-93940955665134469276013260246137470068264141137,\}$ $\xi(C'_4, A) \equiv \{21909436932345934661575706779-594281852957764315833778032779932, 10525-40834106705757613717846113698018715893900221991-0037717794, 18068117860922155552935558841-297858618659751890653711173665053, 4618654347-92734006902153335984462338936974976104967979991-402\}$ The codebooks above are made available to Charlie. This is done during the "setup" phase.

For D=3, the set of permissible errors is simply {0,1,-1, 2,-2,3,-3} and contains 7 elements. Since Alice knows the random parameters A and B, she encrypts these seven errors using the parameter AB to obtain $\epsilon$={16205226028802972103162841218163513327 8955-842122798206614431, 32410452057605944206 32568243-632702665579116842455964132288 62, 884495152287-6083509954362345820173908579 37440803249859599-320, 6482090411521188841265136487265405331 1582-3368491192826457724, 44224757614380417-549771811729100869542896872040162492979966 0, 12-96418082304237768253027297453081066231646 736982-385652915448, 22112378807190208774885905 86-4550434771448436020081246489983 0}

This set of encrypted error patterns is also made available to Charlie during the setup phase.

Now, we proceed through the actual steps of the method.

Suppose that Alice's chosen input is x=81. Then, $\xi$(x,A)=79924766422471132601808927406180 31-42034557285017734559050 990$\in\xi(C_1, A)$. According to the method, Alice sends bin index 1 to Charlie. Unknown to Alice, suppose that Bob's input is y=79. Using the public key and the number B as a parameter, Bob obtains $\xi(-y,B)$
=10281068246031102282693338262810506344612-1778115811380926 6812 and transmits it to Charlie without errors.

Charlie looks at the entries of $\xi(C_1, A)$ and at the set $\epsilon$ and finds that, for 648209041152118-8841265136487265405331158233684911 92826457724$\in\epsilon$ and, 7992476642247113260180892740618031420345572850-17734559050990$\in\xi$(C, A) we have the product,
7992476642247113260180892740618031420345572850-01773455905099 0×10281068246031102282693338-262810506344612177811581138092 66812 mod $N^2$=6482090411521188841265136487265405331158233-68491192826457724.

So,
$\Lambda$={799247664224711326018089274061803142034 5572-85017734559050990}.

Charlie requests Alice for another compressed version of $\xi$(x,A) using the feedback channel. Since $\xi(x,A) \in \xi(C'_2, A)$, Alice sends the bin index 2 to Charlie.

Proceeding as before, Charlie again finds 6482090411521188841265136487265405331158233684-91192826457724 $\epsilon$ □ and 799247664-2247113260180892740618031420345572850177345590 5-0990$\in\xi(C'_2, A)$ that satisfy the homomorphic relation. Then, according to the protocol, $\Lambda'$={79924766422471-13260180892740618031420345572850177345590509 90}. Charlie has $\Lambda \cap \Lambda'$={79924766422471132-6018089274061803142034557285017734559050 990}. Thus he decides that y is compatible with x. Charlie can securely communicate this result to Alice.

Verify that |x−y|=|81−79|=2<3=D. Hence, the method worked correctly in determining that y is compatible with x.

Consider a second example in which, in Step 2, Bob possesses y=107 and $\xi$(−y, B)=9266131122311572-028332532413695306448842093426812129537396 91. In Step 3, Charlie can find 129641808230423-77682530272974530810662316467369823856529154 48$\in\epsilon$ and 7152130573550195564542071815314 8-3049133033417045962641218 $\in\xi(C_1, A)$ such that the product 31122311572028332532413695306448 8420934-2681212953739691×7152130573550195564542071 81531-4830491330334170459626412 18 mod $N^2$=129641-8082304237768253027297453081066231 646736982385-652915448. This means that $\Lambda$={151171-52130573550195564542071815314830491330334170 459-6264121 8}.

However, Charlie cannot find any elements in $\epsilon$ and $\xi(C'_2, A)$ such that the homomorphic relationship holds, that is, $\Lambda'=\phi$. So, Charlie declares that y is not compatible with x.

For this second example, verify that |x−y|=|81−107|=26>3=D. Hence, the method worked correctly in determining that y is not compatible with x.

Secrecy of Input Signals x and y

As noted above, if the signals x and v are dissimilar, then Charlie, only knows $\xi$(−y, B). If they are similar, then Charlie knows both $\xi$(x, A) and $\xi$(−y, B), as well as $\xi$(e, AB). However, because the private key used to decrypt $\xi(\cdot,\cdot)$ is only available to Alice, Charlie cannot discover the signals x or y. In this case, the security of the protocol depends directly on the security of the underlying homomorphic encryption function $t(\cdot,\cdot)$ and on the fact that Charlie has limited computational resources.

EFFECT OF THE INVENTION

The embodiments of our invention have applications in secure classification of, for example, medical data. There are numerous applications in which conventional media signals are converted into compressed feature signals, such as integer or binary feature vectors. The motivation for generating feature signals may be to reduce storage, to enable privacy protection of the original media, to extract beneficial statistical properties, to speed up search algorithms etc. For example, integer feature vectors can be extracted from face images to protect the privacy of the original media while simultaneously facilitating face-based recognition and authentication in the presence of noise.

If a dimensionality-reducing feature transformation is available, then the invention can be used to search for inexact matches in the feature space. For example, we solve the problem of searching a database containing images in encrypted form. Each image is associated with a small set of features. The image is encrypted using conventional encryption, while the feature set, which is much smaller, is encrypted using the homomorphic function. A feature is extracted from the query image, and homomorphic encryption is applied only to the feature. Then, the secure search algorithm attempts to find the encrypted image features that are similar to the encrypted query feature. If the query succeeds, other actions can be performed. For example, Alice might request the full version of the matching images from the encrypted database along with the associated decryption keys. Thus, Alice can obtain the image similar to her image, while finding out nothing about the other images in the database.

Our embodiments may also be used to search for spoken words in audio signals when these signals are encrypted. Our method eliminates key exchanges, except for the single public key exchange during initialization, at the cost of potentially increased complexity of the processing by Charlie.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A method for verifying a similarity or dissimilarity between a first signal and a second signal, comprising the steps of: encrypting homomorphically the first signal in a client processor to produce a first encrypted signal; encoding the first encrypted signal in the client processor using a codebook to produce an index to the codebook, wherein the codebook is homomorphically encrypted; encrypting homomorphically the second signal in a server processor to produce a second encrypted signal; providing the index, the codebook and the second encrypted signal to a third part verifier processor, and wherein the third party verifier processor performs the steps of; and determining the similarity or dissimilarity of the first signal and the second signal based on the index, the second encrypted signal and a similarity constraint.

2. The method of claim 1, wherein the similarity constraint is a squared Euclidean distance.

3. The method of claim 1, wherein the similarity constraint is a mean absolute error.

4. The method of claim 1, wherein the first signal and the second signal are vectors of integers, and wherein the vectors have equal lengths.

5. The method of claim 1, wherein the declaring produces a result of verification, further comprising: transmitting a result of the determining to the client processor.

6. The method of claim 1, further comprising:
selecting the first signal as a common encrypted signal in a bin of a first codebook and in a bin of a second codebook, wherein the bin of the first codebook and the bin of the second codebook have at most one common encrypted signal,
wherein the similarity or the dissimilarity is based on error patterns of a homomorphic relationship between the first encrypted signal and the second encrypted signal.

* * * * *